(12) United States Patent
Chen

(10) Patent No.: US 10,681,080 B1
(45) Date of Patent: Jun. 9, 2020

(54) SYSTEM AND METHOD FOR ASSESSING ANDROID APPLICATIONS MALWARE RISK

(71) Applicant: NTT Innovation Institute, Inc., East Palo Alto, CA (US)

(72) Inventor: Eric Chen, East Palo Alto, CA (US)

(73) Assignee: NTT RESEARCH, INC., East Palo Alto, CA (US)

( * ) Notice: Subject to any disclaimer, the term of this patent is extended or adjusted under 35 U.S.C. 154(b) by 0 days.

(21) Appl. No.: 14/788,144

(22) Filed: Jun. 30, 2015

(51) Int. Cl.
*G06F 21/56* (2013.01)
*H04L 29/06* (2006.01)
*H04L 29/08* (2006.01)

(52) U.S. Cl.
CPC .......... *H04L 63/145* (2013.01); *G06F 21/562* (2013.01); *H04L 67/10* (2013.01)

(58) Field of Classification Search
CPC .............................. G06F 21/562; G06F 21/56
See application file for complete search history.

(56) References Cited

U.S. PATENT DOCUMENTS

| | | | |
|---|---|---|---|
| 7,912,698 B2 | 3/2011 | Statnikov et al. | |
| 8,135,718 B1 * | 3/2012 | Das | G06F 17/30979 707/748 |
| 8,719,924 B1 * | 5/2014 | Williamson | G06F 21/568 713/188 |
| 8,806,647 B1 * | 8/2014 | Daswani | H04L 63/1425 726/25 |
| 8,892,876 B1 * | 11/2014 | Huang | G06F 21/6209 713/165 |
| 9,270,689 B1 * | 2/2016 | Wang | H04L 63/1408 |
| 2002/0052858 A1 | 5/2002 | Goldman et al. | |
| 2002/0138492 A1 | 9/2002 | Kil | |
| 2004/0128535 A1 | 7/2004 | Cheng | |
| 2006/0037080 A1 * | 2/2006 | Maloof | G06F 21/562 726/24 |
| 2008/0279387 A1 | 11/2008 | Gassoway | |
| 2008/0294019 A1 | 11/2008 | Tran | |
| 2009/0028141 A1 | 1/2009 | Vu Duong et al. | |
| 2009/0254992 A1 * | 10/2009 | Schultz | H04L 63/145 726/24 |
| 2010/0007489 A1 | 1/2010 | Misra et al. | |
| 2010/0183211 A1 | 7/2010 | Meetz et al. | |
| 2010/0201489 A1 | 8/2010 | Griffin | |
| 2011/0299420 A1 | 12/2011 | Waggener et al. | |
| 2012/0324568 A1 * | 12/2012 | Wyatt | G06F 21/51 726/13 |
| 2013/0111036 A1 | 5/2013 | Ozawa et al. | |
| 2013/0347094 A1 * | 12/2013 | Bettini | G06F 21/577 726/11 |
| 2014/0122370 A1 | 5/2014 | Jamal et al. | |

(Continued)

OTHER PUBLICATIONS

Auto-WEKA webpage printed regarding algorithms (2 pages) (Chris Thornton et al.) Feb. 17, 2015.
Ayat, N.E.; Cheriet, M.; Suen, C.Y.; "Automatic Model Selection for the optimization of SVM Kernels," Mar. 21, 2005 (35 pages).
Brodley, Carla E., "Addressing the Selective Superiority Problem: Automatic Algorithm/Model Class Selection," (1993) (8 pages).

(Continued)

*Primary Examiner* — Khang Do
(74) *Attorney, Agent, or Firm* — DLA Piper LLP (US)

(57) ABSTRACT

A system and method for malware assessment of an unknown application file are provided. The system and method are particularly applicable to malware assessment for Android® operating system based applications. The malware assessment increases the confidence in an assessment that an application is benign or malware.

12 Claims, 14 Drawing Sheets

(56) References Cited

U.S. PATENT DOCUMENTS

| | | | |
|---|---|---|---|
| 2014/0136846 A1 | 5/2014 | Kitze | |
| 2014/0181973 A1* | 6/2014 | Lee | G06F 21/562 |
| | | | 726/23 |
| 2014/0201374 A1 | 7/2014 | Ashwood-Smith | |
| 2014/0219096 A1 | 8/2014 | Rabie et al. | |
| 2014/0259170 A1 | 9/2014 | Amsler | |
| 2014/0317261 A1 | 10/2014 | Shatzkamer et al. | |
| 2014/0317293 A1 | 10/2014 | Shatzkamer | |
| 2015/0082308 A1 | 3/2015 | Kiess et al. | |
| 2015/0227964 A1* | 8/2015 | Yan | G06Q 30/0244 |
| | | | 705/14.43 |
| 2015/0288767 A1 | 10/2015 | Fargano et al. | |
| 2015/0317169 A1 | 11/2015 | Sinha et al. | |
| 2015/0326535 A1 | 11/2015 | Rao et al. | |
| 2015/0333979 A1 | 11/2015 | Schwengler et al. | |
| 2015/0356451 A1* | 12/2015 | Gupta | G06N 20/00 |
| | | | 706/52 |
| 2015/0381423 A1 | 12/2015 | Xiang | |
| 2016/0006642 A1 | 1/2016 | Chang et al. | |
| 2016/0050161 A1 | 2/2016 | Da et al. | |
| 2016/0057234 A1 | 2/2016 | Parikh et al. | |
| 2016/0154960 A1* | 6/2016 | Sharma | G06F 21/56 |
| | | | 726/25 |
| 2016/0248805 A1 | 8/2016 | Burns et al. | |
| 2016/0364553 A1 | 12/2016 | Smith | |

OTHER PUBLICATIONS

Chapelle, Olivier; Vapnik, Vladimir; Bousquet, Olivier; Mukherjee, Sayan; "Choosing Multiple Parameters for Support Vector Machines," *Machine Learning*, 46, 131-159, 2002 © 2002 Kluwer Academic Publishers (29 pages).

Lee, Jen-Hao and Lin, Chih-Jen, "Automatic Model Selection for Support Vector Machines, pp. 1-16" (2000).

Smith, Michael R.; Mitchell, Logan; Giraud-Carrier, Christophe; Martinez, Tony; "Recommending Learning Algorithms and Their Associated Hyperparameters," Jul. 7, 2014 (2 pages).

Thornton, Chris. Thesis: "Auto-WEKA: Combined Selection and Hyperparameter Optimization of Supervised Maching Learning Algorithms," Submitted to the University of British Columbia, Mar. 2014 (75 pages).

Thornton, Chris; Hutter, Frank; Hoos, Holger H.; Leyton-Brown, Kevin. "Auto-WEKA: Combined Selection and Hyperparameter Optimization of Classification Algorithms," Mar. 2013 (9 pages).

Wolinski, Christophe; Kuchcinski, Krzysztof. "Automatic Selection of Application-Specific Reconfigurable Processor Extensions." *Design, Autoination & Test in Europe Conference* (Date '08), Mar. 2008, Munich, Germany, pp. 1214-1219 (7 pages).

Workshop Handout edited by Joaquin Vanschoren, Pavel Brazdil, Carlos Soares and Lars Kotthoff, "Meta-Learning and Algorithm Selection Workshop at ECAI 2014," MetaSel 2014, Aug. 19, 2014 (66 pages).

* cited by examiner

Delvik

'AccessibilityNodeProviderKitKatImpl',
'AccessibilityNodeProviderStubImpl',
'AccessibilityRecordCompat.java',
'AccessibilityRecordCompatIcs.java',
'AccessibilityRecordCompatIcsMr1.java',
'AccessibilityRecordCompatJellyBean.java',
'AccessibilityRecordIcsImpl',
'AccessibilityRecordIcsMr1Impl',
'AccessibilityRecordImpl',
'AccessibilityRecordJellyBeanImpl',
'AccessibilityRecordStubImpl',
'AccessibilityServiceInfoCompat.java',
'AccessibilityServiceInfoCompatIcs.java',
'AccessibilityServiceInfoCompatJellyBeanMr2.ja
'AccessibilityServiceInfoIcsImpl',
'AccessibilityServiceInfoJellyBeanMr2',
'AccessibilityServiceInfoStubImpl',
'AccessibilityServiceInfoVersionImpl',
'AccessibilityStateChangeListenerBridge',
.....

Manifest

```
<?xml version="1.0" encoding="utf-8"?>
<manifest android:installLocation="0" android:versionCode="2821"
android:versionName="2.8.2.1" package="kov.theme.tersus2"
platformBuildVersionCode="21" platformBuildVersionName="5.0.1-1624448"
xmlns:android="http://schemas.android.com/apk/res/android">
<uses-sdk android:minSdkVersion="14" android:targetSdkVersion="20">
</uses-sdk>
<uses-permission android:name="android.permission.INTERNET">
</uses-permission>
<uses-permission android:name="android.permission.ACCESS_NETWORK_STATE">
</uses-permission>
<uses-permission android:name="android.permission.WRITE_EXTERNAL_STORAGE">
</uses-permission>
<uses-permission android:name="android.permission.SET_WALLPAPER">
.....
```

| Feature Group | Description | Example |
|---|---|---|
| Permission | Request to access to security-relevant resources | SEND_SMS |
| Intent | Request to exchange data with different components and applications | BOOT_COMPLETED |
| API calls | API calls revealed in disassembled code | getDeviceId(), Cipher.getInstance() |
| Network addresses | IP addresses, hostnames and URLs found in the disassembled code | 1.1.1.1 |
| Hardware components | Request to access to certain hardware components | camera, touchscreen, microphone, camera |
| App components | Request to access other app components | Other app's activities, services, content provider and broadcast receivers |

| | Bytecode Base Model | | 1-gram Base Model | | 2-gram Base Model | | 3-gram Base Model | |
|---|---|---|---|---|---|---|---|---|
| | - | + | - | + | - | + | - | + |
| App 1 | 0.2 | 0.8 | 0.3 | 0.7 | 0.25 | 0.75 | 0.6 | 0.4 |
| ⋮ | | | | | | | | |
| App N | 0.3 | 0.7 | 0.25 | 0.77 | 0.2 | 0.8 | 0.6 | 0.4 |

FIGURE 10

SYSTEM AND METHOD FOR ASSESSING ANDROID APPLICATIONS MALWARE RISK

FIELD

The disclosure relates generally a system and method for assessing the likelihood that a particular piece of Android-based device app code is a piece of malware.

BACKGROUND

Malware is a piece of code (or embedded within another piece of legitimate code) that is designed to do nefarious things if downloaded onto a computer, such as steal information for the computer, utilize the resources of the computer for illegal purposes without the knowledge of the user and the like.

Many systems exist that attempt to detect malware for a computer system. Examples of such systems include typical virus scanning system used on most laptops and desktop computers. Further, systems exist that attempt to detect malware for a mobile device and more specifically an Android operating system based device. However, these systems do not provide a high level of confidence that either malware has been identified or that malware has not been detected. Furthermore, due to the lack of confidence, these systems may generate false positives (an app that is identified as malware, but is in fact not malware) and false negatives (an app that is identified as clean, but is in fact malware.)

A number of the malware detection systems use "signatures" to be able to detect the malware. The limitation with these systems is that they only detect malware that matches the signature which means that can have a lot of false negatives and do not provide a high confidence level.

BRIEF DESCRIPTION OF THE DRAWINGS

FIG. 7A illustrates an example of bytecode and the results of a method for extracting malware features from bytecode;

FIG. 7B illustrates examples of the predefined features that may be extracted from a bytecode;

FIG. 10 illustrates more details of the weighting process of the models;

DETAILED DESCRIPTION OF ONE OR MORE EMBODIMENTS

The disclosure is particularly applicable to malware assessment for Android® operating system based applications and it is in this context that the disclosure will be described. It will be appreciated, however, that the system and method has greater utility, such as to assessing malware for other types of mobile applications. The malware assessment increases the confidence in an assessment that an application is benign or malware.

An Android® operating system based application may use Android application package (APK) files that is the package file format used to distribute and install application software and middleware onto Google's Android operating system. To make an APK file, a program for Android is first compiled, and then all of its parts are packaged into one file and the APK file contains all of that program's code (such as .dex files), resources, assets, certificates, and manifest file. Thus, the below described malware assessment system and method may be particularly applicable to APK files.

Figure 1:
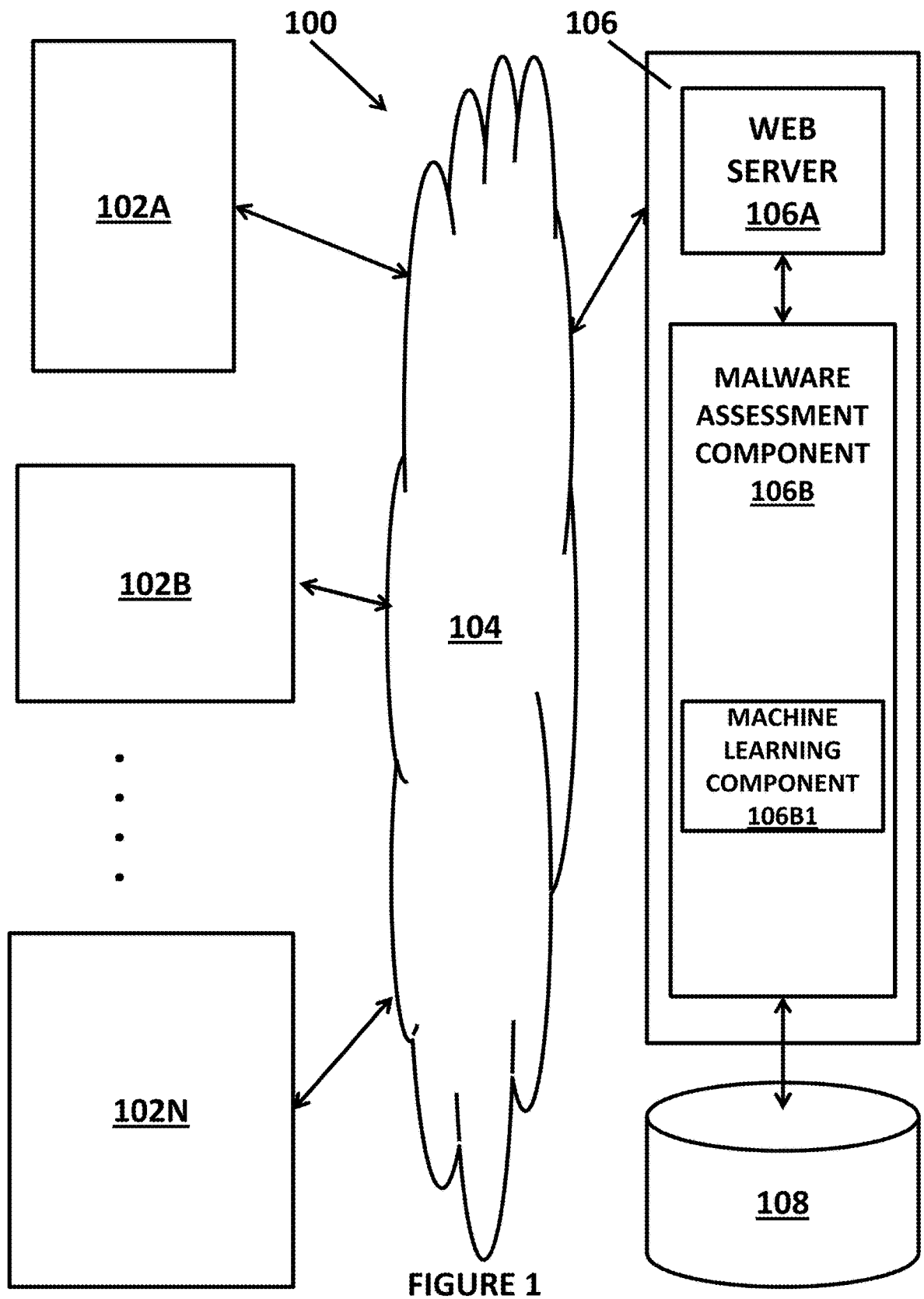
FIG. 1 illustrates an example of a system that may include a malware assessment component.
Figure 13:
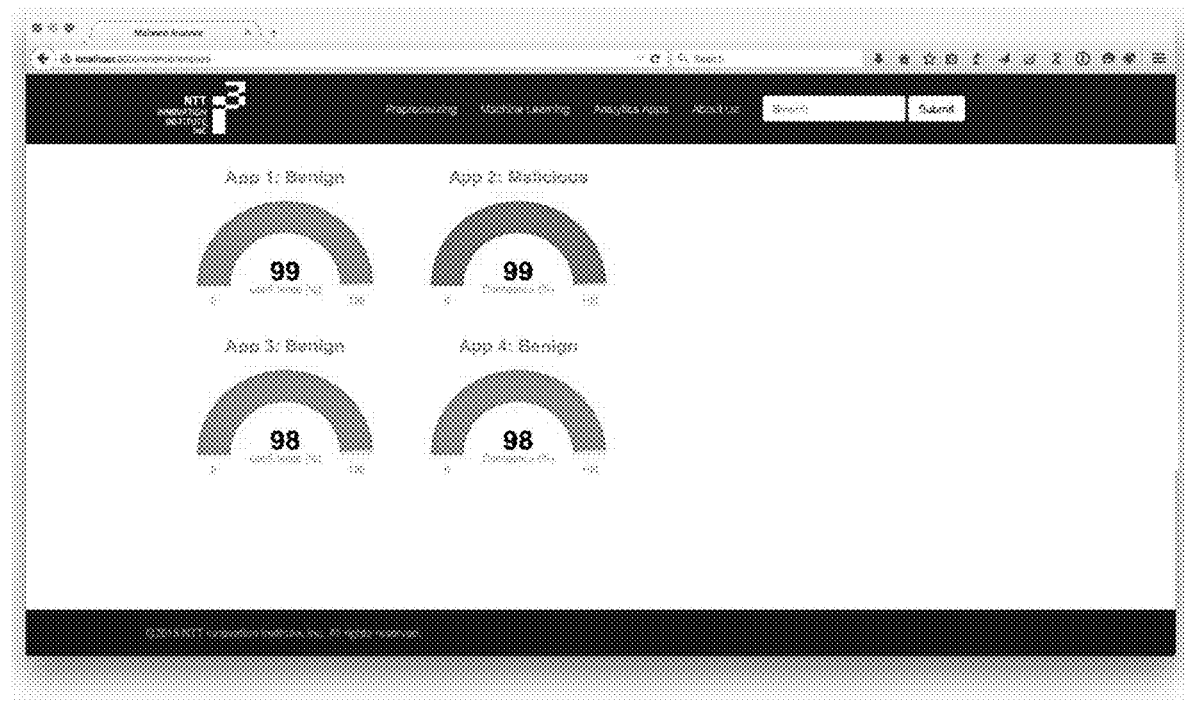
FIG. 13 is an example of a user interface for displaying malware assessments.

FIG. 1 illustrates an example of a system 100 that may include a malware assessment component. The system 100 may have one or more computing devices 102 that couple to and connect over a communications path 104 to a backend component 106. The backend component 106 may retrieve/obtain one or more file package of mobile applications, such as APK files for Android based applications, or the one or more files may be already stored in the system or the one or more files may be received from a particular computing device 102. The backend component 106 may perform the malware assessment method described below on the one or more files and return results of the malware assessment to the computing device for display by the computing device 102 (an example of which is shown in FIG. 13.)

As shown in FIG. 1, the system may permit one or more computing devices 102, such as computing devices 102A, 102B, . . . 102N, to each couple to and communicate with the backend component 106. Each computing device may be a processor based device with typical components including, in addition to the processor, a memory, an operating system, a persistent storage, such as flash memory or a disk drive, a display, an input device, such as a keyboard, touchscreen, etc., and communication circuits that permit the computing device to couple to the communications path 104 and communicate with the backend component 106. For example, each computing device may be a smartphone device, such as an Apple® iPhone® or Android® operating system based device, a tablet computer, a personal computer, a terminal, a cellular phone device and any other processor based devices. In one implementation, each computing device 102 may have a browser application that is executed by the processor to couple to the communications path 104 and exchange data with the backend component 106 using a known protocol such as TCP/IP, HTTP or HTTPS and HTML. In other implementations, each computing device 102 may have a mobile application or an application that may be downloaded that is used to interact with the backend component 106. For example, each computing device 102 may use a well known browser application to connect to and communicate with the backend component 106.

The communications path 104 may be a wireless network or a wired network or a combination of one or more wireless networks and one or more wired networks. The wireless network may be a wireless computer network, a cellular data network or a satellite data network. The wired network may be the Internet, Ethernet and the like. The communications path 104 may use various communication protocols and data format protocols including TCP/IP, HTTP, HTTPS, REST and JSON.

The system may also have a storage 108 that is coupled to the backend component 106. The storage 108 may be hardware based storage, such as a database server, a hard disk drive, etc. or a software based storage device, such as a relational database, a database, etc. The storage 108 may store various data of the analysis system including the one or more files for the applications, user data, training set data used to perform the malware assessment and the computer code for the malware assessment system when the malware assessment system is being implemented in software.

The backend component 106 may be implemented using one or more computing resources in which each computing resource may be a server computer, a data center computing component, a cloud computing resources, a hardware device and the like. The computing resources may include, for example, one or more processors, a blade server, a storage device, an application server and the like. Furthermore, the backend component 106 may be implemented using specialized hardware devices that are not general purpose computers and are specifically designed to implement the data analysis system. The individual components of the backend component 106 described below may each be implemented in software or hardware.

The backend component 106 may include a web server 106A when each computing device is using a browser application and the web server manages the connection by each computing device and the data exchange between the computing device and the backend component 106 such as by generating and exchanging data using HTML with each computing device, such as user interfaces for uploading one or more files and user interface to display the results of the malware assessment. The web server 106A may be a hardware web server or a software based web server.

The backend component 106 may further include a malware assessment component 106B. The malware assessment component 106B may be implemented in hardware or software. When the malware assessment component 106B is implemented in software, each component of the malware assessment component 106B, including a machine learning component 106B1, may be a plurality of lines of computer code that may be executed by a processor of the backend component wherein the processor is configured to perform the operations of the malware assessment component 106B as described below. When the malware assessment component 106B is implemented in hardware, each component of the malware assessment component 106B may be a piece of hardware that performs the operations of the malware assessment component 106B as described below. For example, each component may be a programmable logic device, a microcontroller, a state machine, an application specific integrated circuit and the like. The backend component 106 may further include the machine learning component 106B1 that performs the machine learning processes of the malware assessment system as described below.

Figure 2:
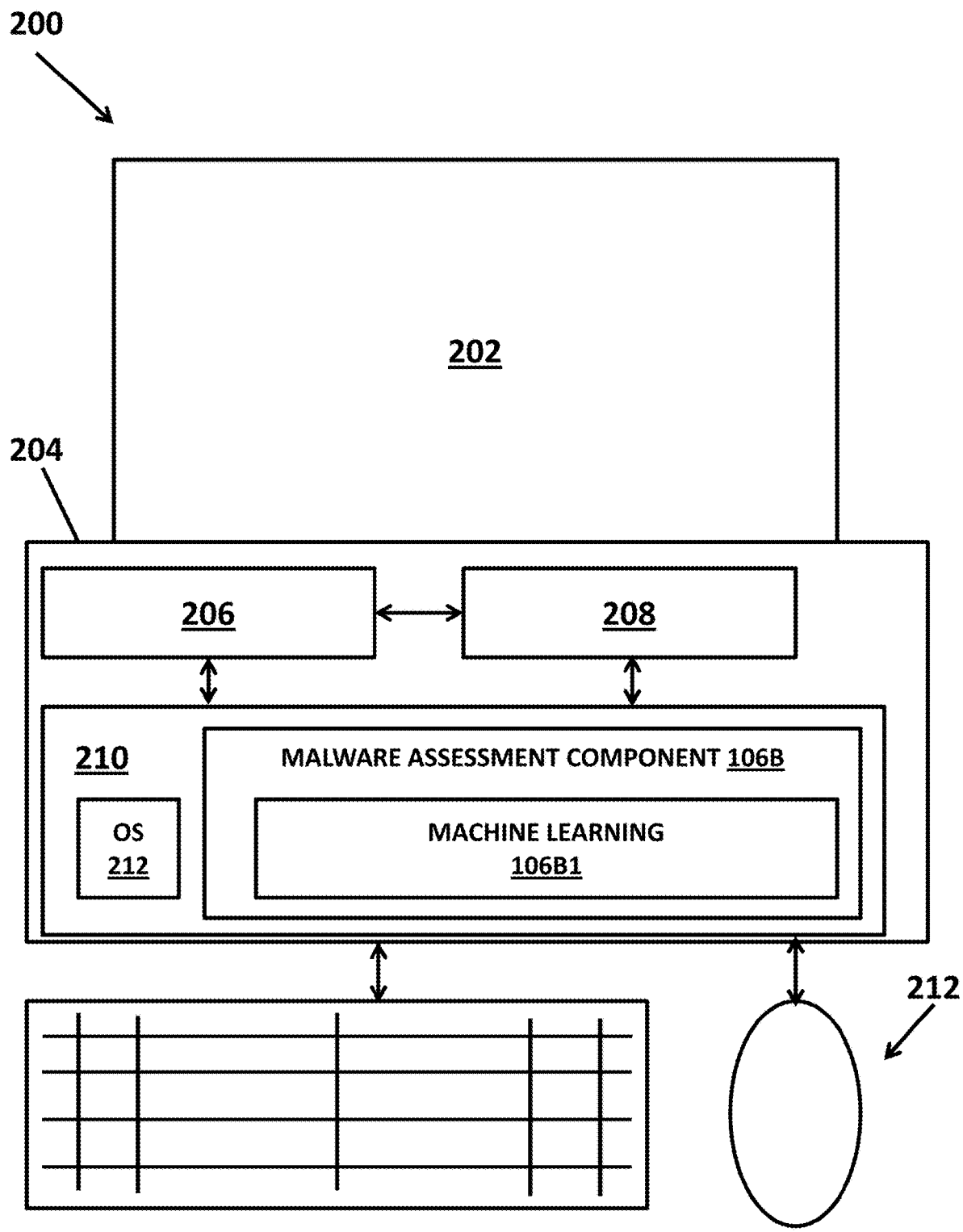
FIG. 2 illustrates another example of a system that may include a malware assessment component.

FIG. 2 illustrates an example of a second embodiment of a system 200 using a standalone computer system. This embodiment of the system 200 has the same malware assessment component 106B and its component 106B1 that may be resident in a memory 210 of the computer system and may be executed by a processor 206 of the computer system to implement the malware assessment component 106B and its component 106B1. In this system 200, the computer system may be standalone computer system on which the malware assessment component 106B and its component 106B1 and the one or more files are resident on the computer system so that the computer system has the data and performs the processes of the malware assessment component 106B and its component 106B1.

The computer system may include a display 202 and a housing 204 as well as one or more input/output devices 212 such as a keyboard and mouse shown. The computer system also has the processor 206 and memory 210 and a persistent storage 208, such as a hard disk drive or flash memory that are connected to each other and housed in the housing 204. The memory of the computer system may store a typical operating system 212 and the malware assessment component 106B and its component 106B1. Thus, as shown in FIGS. 1-2, the malware assessment component may be implemented using either hardware or software and may be implemented in various configurations and computer architectures that are within the scope of the disclosure.

Figure 3:
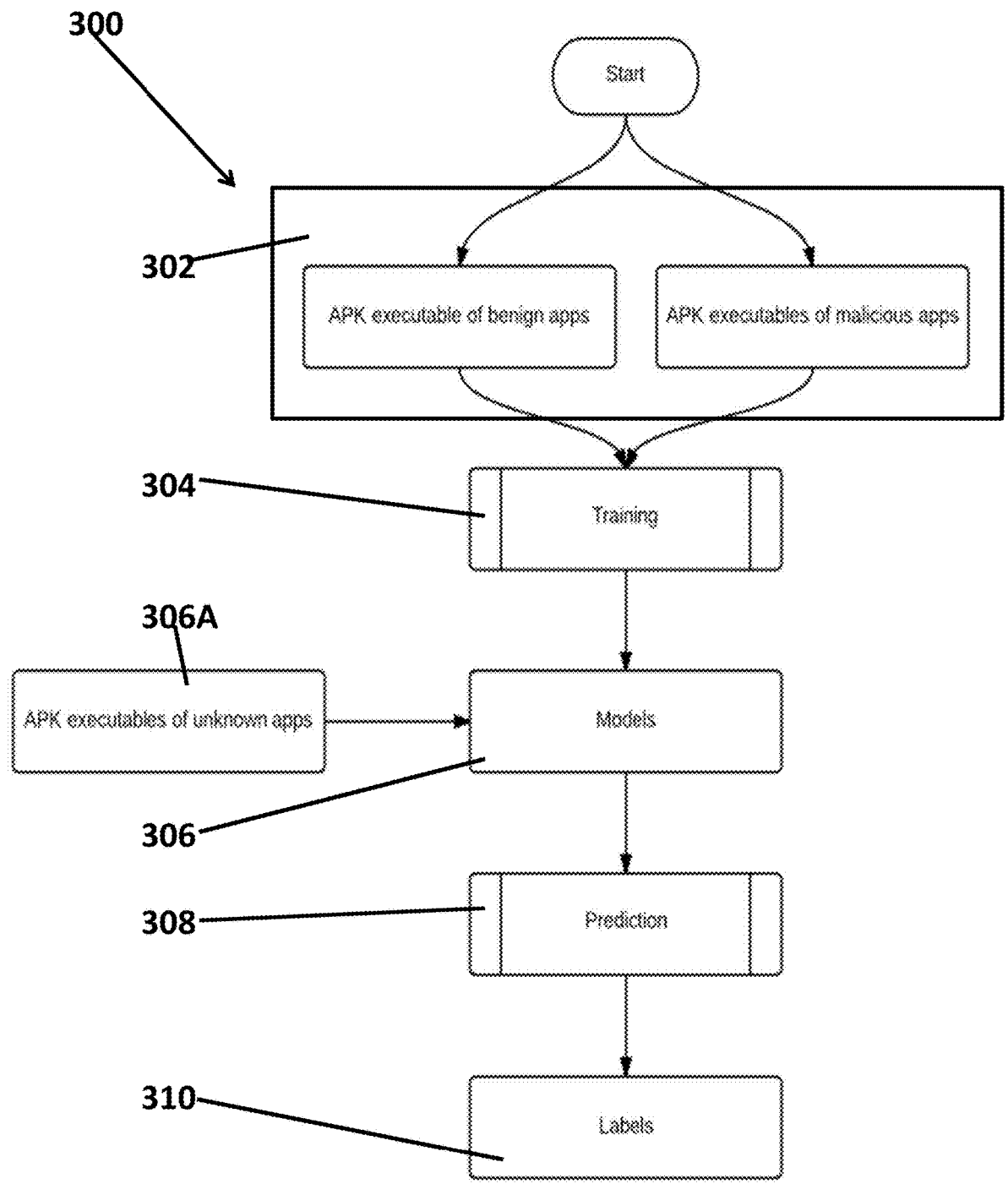
FIG. 3 is a flowchart that illustrates a method for malware assessment.

FIG. 3 is a flowchart that illustrates a method 300 for malware assessment. The method and processes described below may be implemented using the malware assessment component 106B and the machine learning component 106B1. Thus, the method and processes described below may be implemented by a processor that executes lines of computer code so that the processor is configured to perform the processes described below. Alternatively, the method and processes described below may be implemented in a hardware device that performs the processes described below.

Figure 4:
FIG. 4 illustrates an example of a user interface for uploading benign apps and malware apps for the training of the system in FIGS. 1-2.

In the method, one or more files for one or more applications, such as APK files for Android based applications, may be obtained (302) which are used for training the machine learning algorithms of the method. The one or more files may be obtained from a computing device 102, retrieved from the storage 108 or from any other source. In some embodiments, the one or more files may include at least one APK executable file for a known benign application (known to be not malware) and at least one APK executable file for a malicious application (known to be malware.) An example of a user interface that may be used to receive the one or more files is shown in FIG. 4 in which the user interface provides an area for uploading the benign application APK file(s) and an area for uploading the malware application APK file(s).

Figure 5:
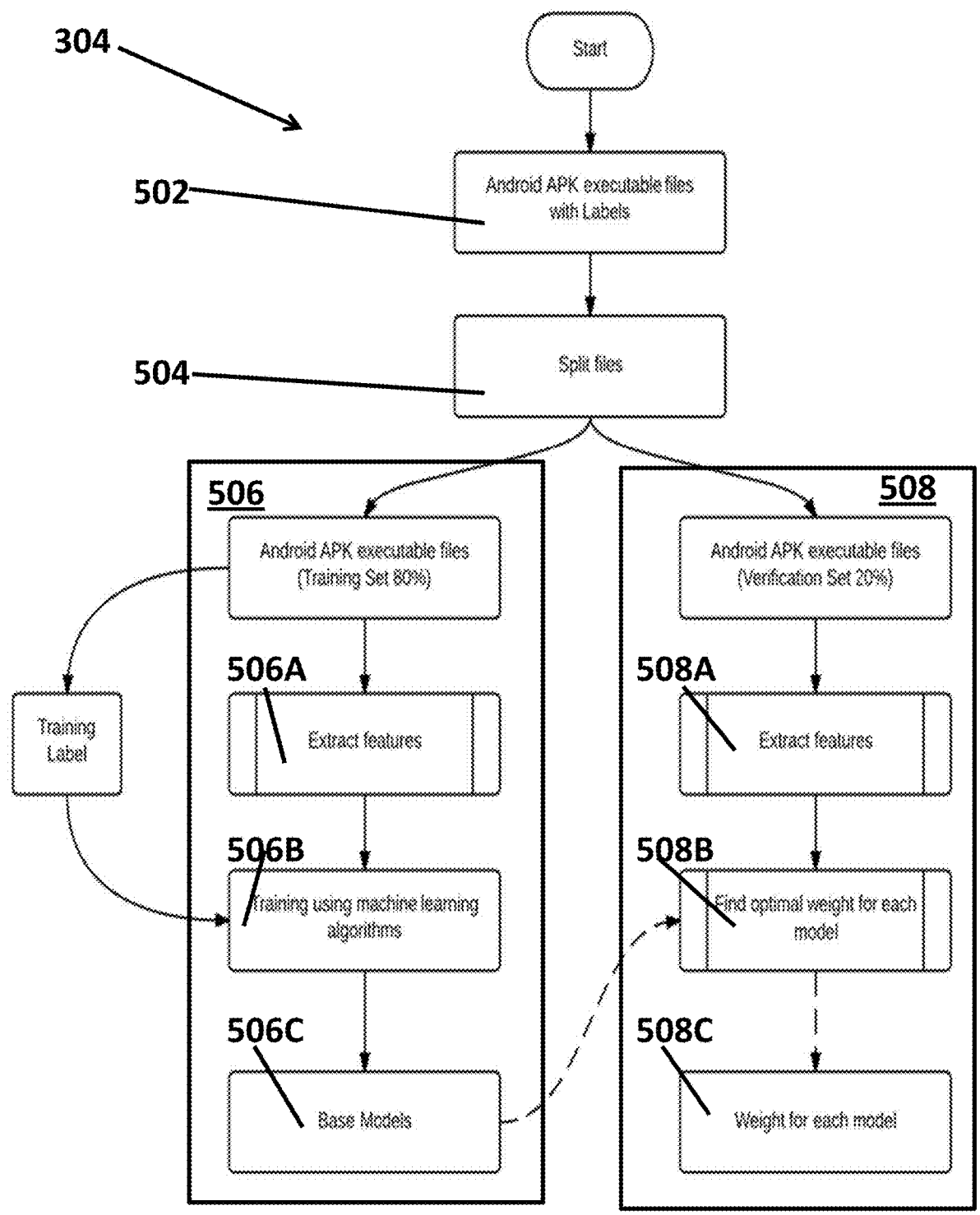
FIG. 5 is a flowchart of a method for malware assessment training that is part of the method in FIG. 3.

Once the one or more files are received, the method may perform training (304) based on the one or more files. During the training, the machine learning component 106B1 is trained using the one or more files so that the malware assessment may be performed. Further details of the training process 304 is shown in FIG. 5 and is described in more detail below. As a result of the training 304, the method may generate one or more models 306 that may be used to perform the malware assessment. The one or more models and at least one file from an unknown application 306A may be used for a prediction process 308 in which the malware assessment may generate an assessment/label (310), such as a probability, for the at least one file from an unknown application 306A. Thus, the method involves various processes/algorithms that can be trained and then used to generate a more accurate malware assessment for the unknown application 306A.

FIG. 5 is a flowchart of a method for malware assessment training 304 that is part of the method in FIG. 3. The method for malware assessment training 304 may involve various algorithms and processes to train the machine learning component 106B1 algorithms. The training method may receive the one or more files in which each file is known to be benign or malware (502) and split the one or more files (504) into a training set and a verification set.

Figure 6:
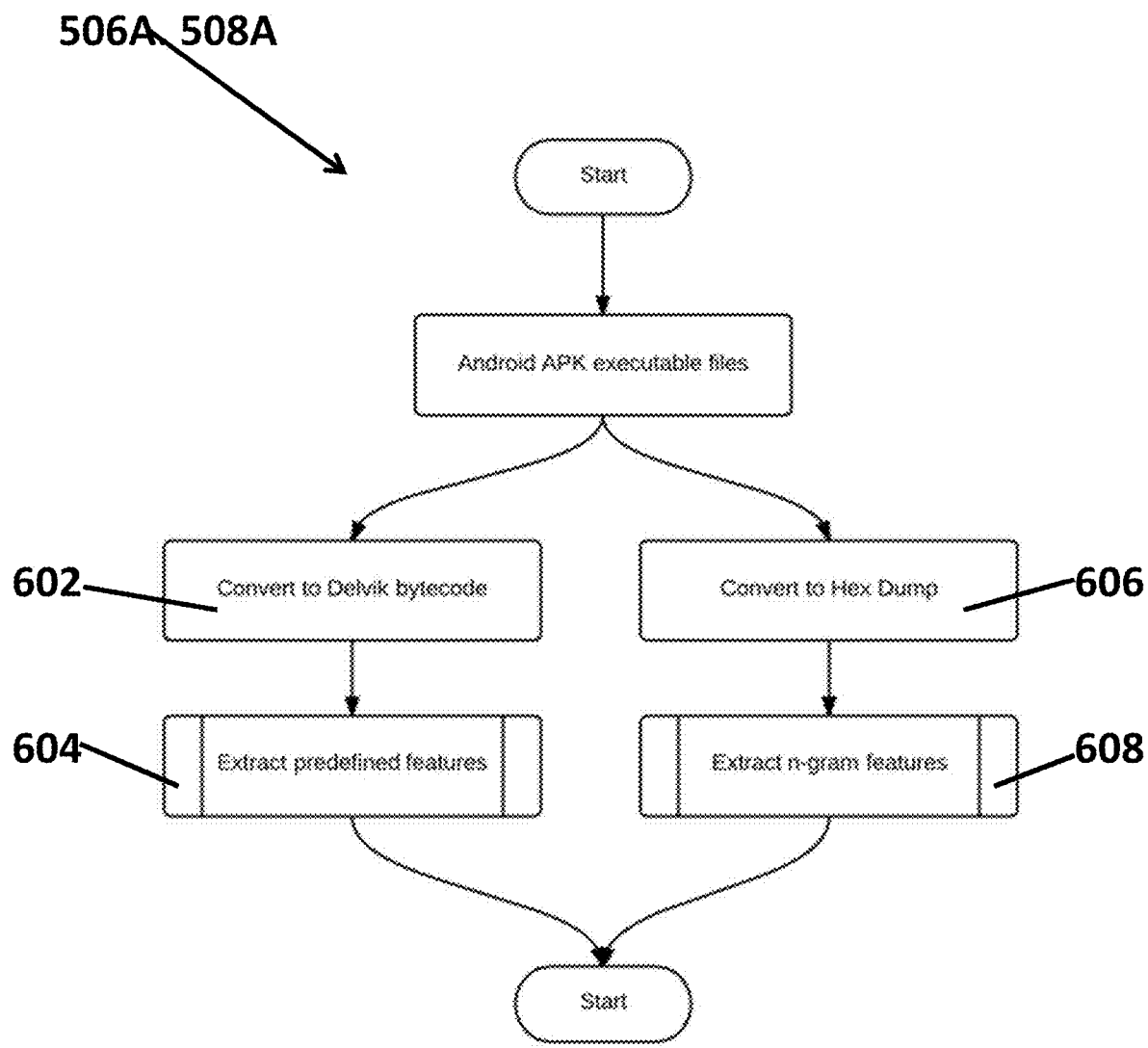
FIG. 6 is a flowchart of a method for extracting features from a potential malware application.
Figure 9:
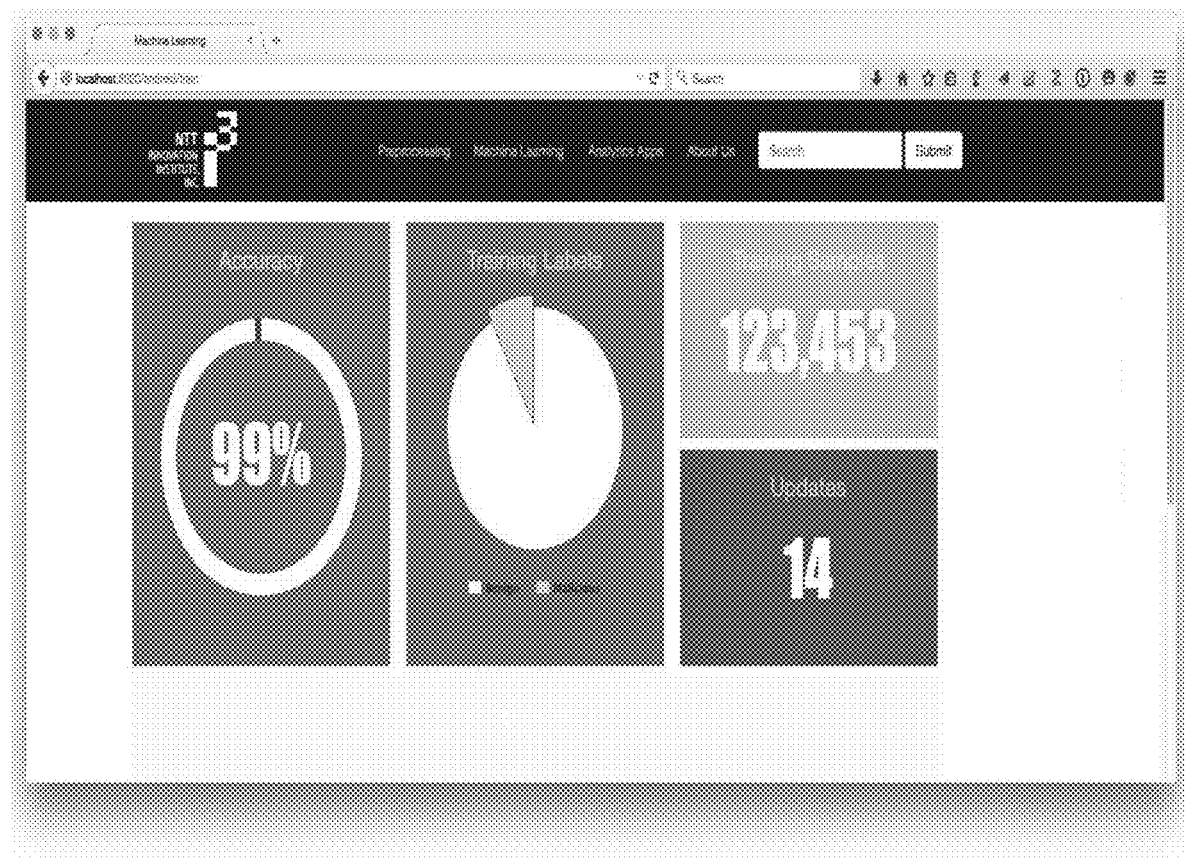
FIG. 9 illustrates an example of a user interface for the malware assessment system during training.

For the training set of files, the method performs a process (506) to extract features (506A) from the files as described and train the machine learning algorithms (506B) to generate a base model 506c for each feature set created in FIGS. 6 (602 and 606). Similarly, for the verification set of files, the features may be extracted (508A). The method may then find an optimal weight for each base model generated (508B) and a weight is assigned to each model in accordance to its prediction accuracy on the verification set (508C). The weight assigned to each model makes a model that is more indicative of a benign application or a malware application based on the features more influential during the prediction process described below. FIG. 9 illustrates an example of a user interface that displays the results of the training process to the user.

FIG. 6 is a flowchart of more details of the method 506A, 508B for extracting features. To perform feature extraction for either the one or more files used for training or for a file for an unknown application during prediction, the method may convert the file into two different formats: a Delvik bytecode file (602) and a hex dump file (606). For each of the different format files, the method may then extract features from those files (604, 608). For the bytecode file, the method may extract predefined features. For the hexcode file, the method may extract one or more n-gram features. FIG. 7A shows an example of portion of a bytecode file (including the Delvik and Manifest) and the features (such as SEND_SMS, DELETE_PACKAGES, etc.) that may be extracted from a plurality of applications that are a combination of known benign applications and known malware applications (during training) or may be an application in which it is unknown if the application is benign or malware (during the prediction.) As shown in FIG. 7, the extracted features may be stored in a matrix in which a "0" indicates that that feature does not appear in the particular application and a "1" indicates that that feature appears in the particular application. FIG. 7B illustrates examples of the predefined features that may be extracted from a bytecode and further details of those exemplary features.

Figure 8:
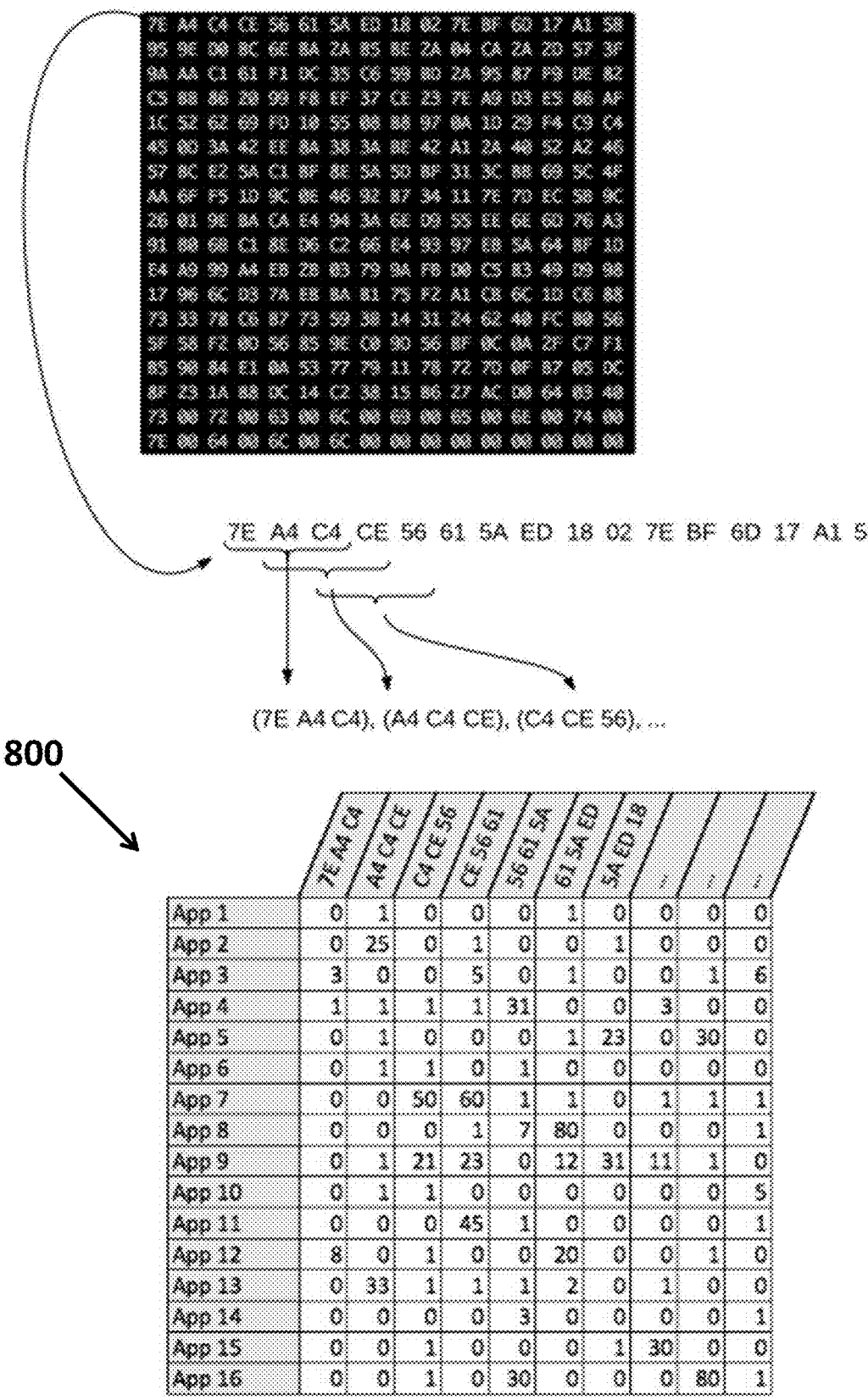
FIG. 8 illustrates an example of a hex dump and the results of a method for extracting features from the hex dump.

FIG. 8 shows an example of a portion of a hex dump from an application in which the features are one or more n-grams in which n has a value from 1 to 100 that are extracted as described above. In the example shown in FIG. 8, the features are 3-grams since each feature has three hex values. However, the system may extract 1-grams, 2-grams, 3-grams, 4-grams, etc. or may extract 3-grams, 4-grams and 1-grams from each file which are within the scope of the disclosure. As shown in FIG. 8, the features may be stored in a matrix in which a "0" indicates that that feature does not appear in the particular application and a "1" indicates that that feature appears in the particular application.

Returning to process 506B, the training is performed using two inputs: a feature set and a label (benign or malicious) of all files in the training set. The output is one base model for each feature set. The method uses the Support Vector Machine (SVM) algorithm to train a base model (506C) on feature set generated from bytecode (604), a Gradient Boosting algorithm may be used to train a base model (506C) on 1-gram feature set generated from hex dump (608) and a Logistic Regression algorithm to train a base model (506C) on each n-gram feature set for n>2.

FIG. 10 illustrates the output of each base model 1000 after taking a feature set of unknown files as input. Each base model, such as a bytecode model and the various n-gram models, outputs a label probability for each file. For each output, a not malware (benign file) probability may be indicated by a "−" while a malware probability is indicated by a "+". Thus, for the first training app, the bytecode base model indicates a 20% probability of a benign file and a 80% probability of a malware file. The label with higher probability is then selected as the predicted label for the file.

During the weighting in 508B, the base models results may be used to weight each model. The results of the weighting are that certain models have specific features that may be more likely to indicate a benign file or a malware file. In some embodiments, the weighting may use a known logarithm loss algorithm ("log loss") (further details of which may be found at https://www.kaggle.com/wiki/LogarithmicLoss which is incorporated herein by reference) that takes two inputs and generates an output. For example, Input 1: Actual label (e.g. APP1: Benign, APP2: Malicious, APP3: Malicious . . . )

Input 2: Prediction (e.g. APP1: 20% benign 80% malicious, APP2: 30% benign 70% malicious . . . )

Output: Log loss (e.g. 0.38243, the lower the better)

The method thus generates a log loss for each base model and based on the overall log loss number for each model, gives more weights to models with lower log loss (i.e. higher accuracy) and vice versa. The combined model often result in lower log loss than any base model alone. For example, if we assign weights of 0.4, 0.3, 0.2, 0.1 to Bytecode base model, 1-gram model, 2-gram model and 3-gram model respectively in FIG. 10, the resulting probability that App1 is malware would be (0.4*0.8+0.3*0.7+0.2*0.75+0.1*0.4)/4=0.72

Figure 11:
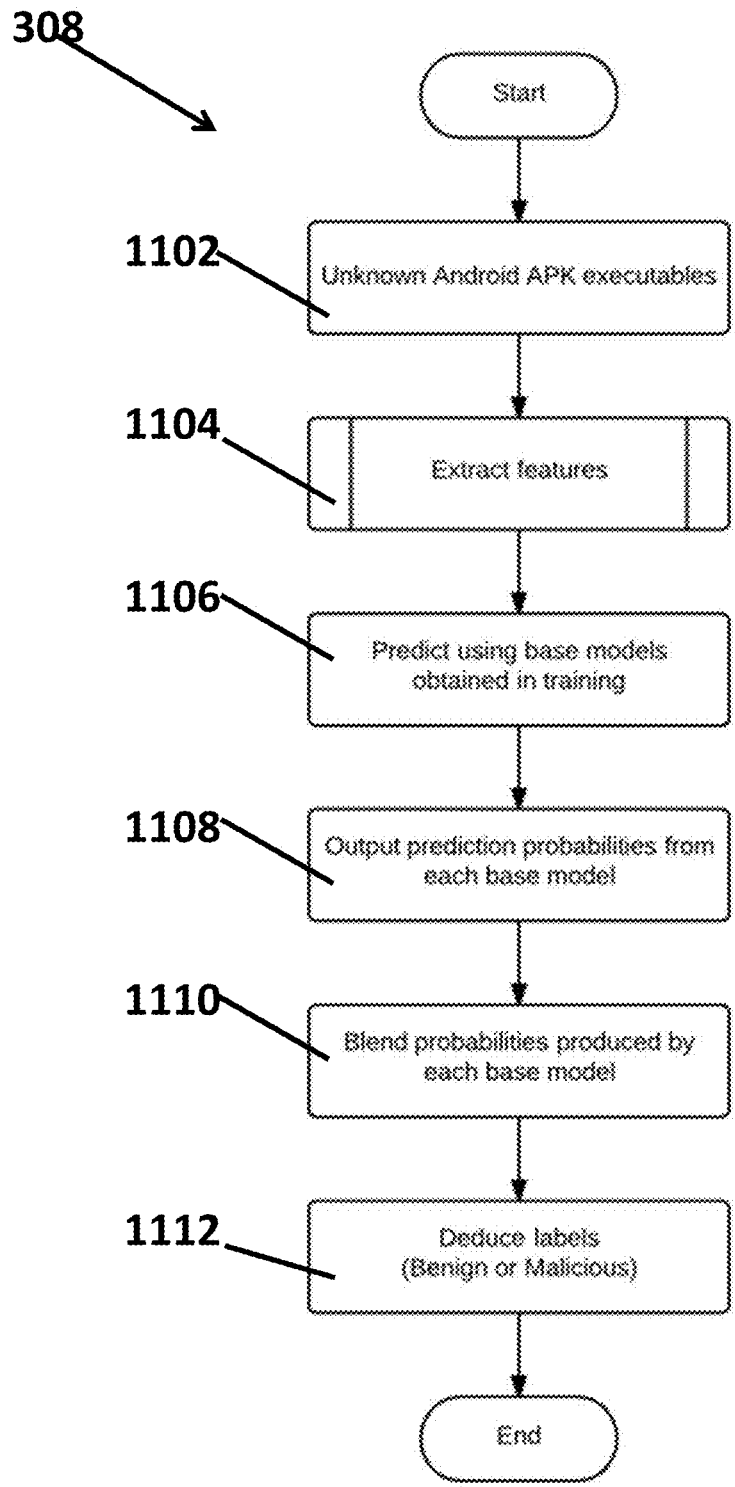
FIG. 11 is a flowchart of a method for predicting malware assessment.
Figure 12:
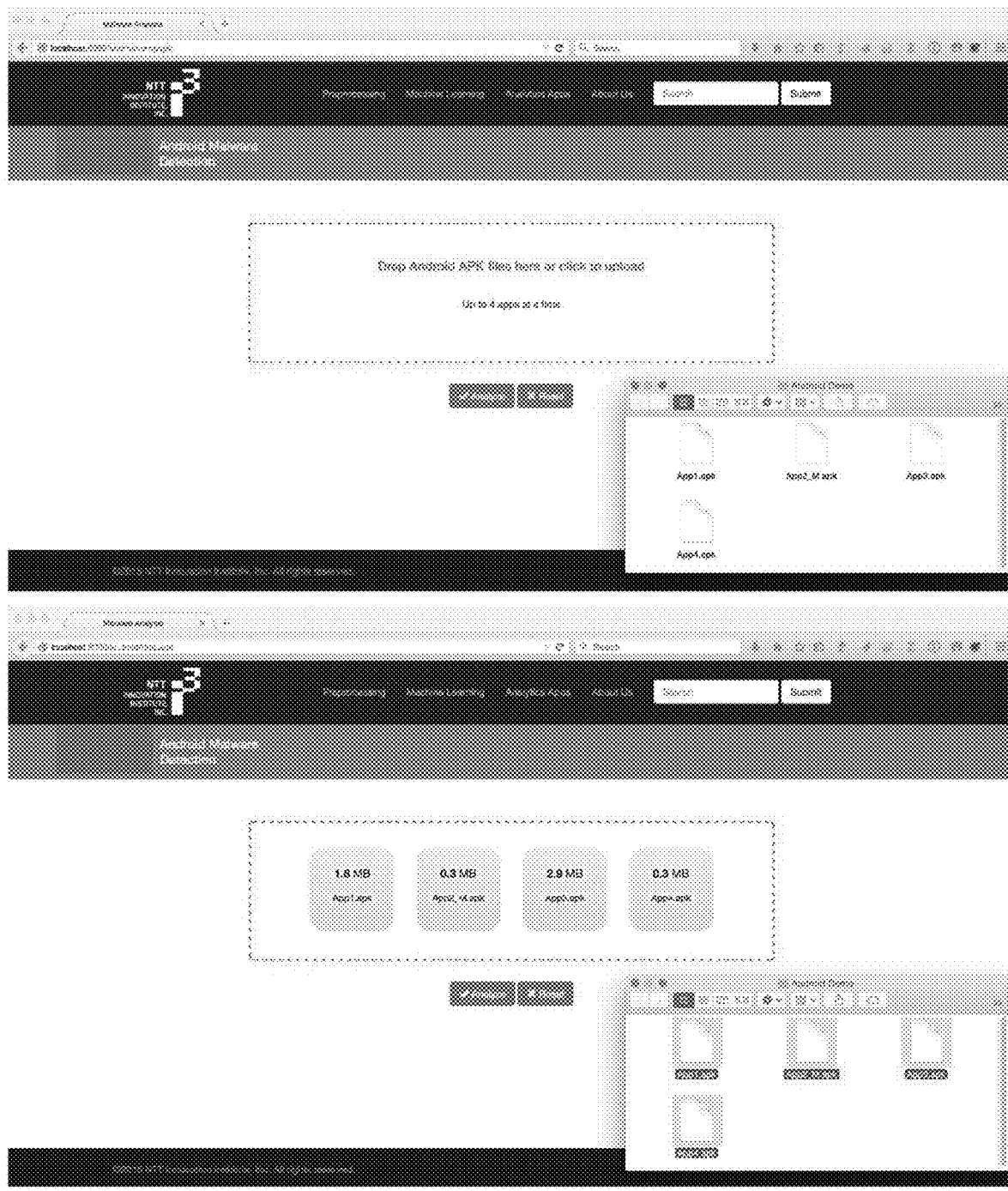
FIG. 12 illustrates an example of a user interface for uploading an unknown app for assessment by the malware assessment system.

FIG. 11 is a flowchart of a method 308 for predicting malware assessment based on the weights and the models from the training. In the method, one or more unknown application files, such as an Android APK executable, are received (1102) such as by using an exemplary user interface in FIG. 12. For each unknown file, it is not known whether the file is a benign file or a malware file and then system and method provides increased accuracy/confidence over existing systems. Once the file(s) are received, the method may extract features as described above, for each file (1104). Thus, as with the training, the method may extract both the bytecode features and one or more n-gram features for each unknown file. For each unknown file and its extracted features, the method generates a probability for each unknown file based on the base models obtained during training (1106). The same algorithms described above that may be used for the training process may also be used for this prediction process. Specifically, the extracted features of the unknown file are compared to the features of each base model and each base model generates a probability that the unknown file is benign or malicious based on the particular base model.

The method may then output the prediction probabilities from each base model (1108) and blend the probabilities of the base models (1110). The method may then generate a label (benign or malicious) for each unknown file (1112). An example of the user interface showing the generated labels (benign or malicious) for several unknown apps is shown in FIG. 13. The user interface may also display a confidence associated with each label that is generated based on the blending of the probabilities as described above.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method for malware assessment, comprising:
generating a plurality of base models from a plurality of Android application package (APK) files for applications that are known to be one of benign and malicious, each base model specifying, for a particular application, a probability of a benign application based on a set of features extracted from the APK file for the particular application and a probability of a malicious application based on a set of features extracted from the APK file for the particular application, wherein generating the plurality of base models further comprises receiving a feature set generated from a bytecode file and a feature set generated from a hex dump file for the applications that are known to be one of benign and malicious, training a machine learning base model on the feature set generated from the bytecode file and training a machine learning base model on the feature set generated from the hex dump to generate the plurality of machine learning base models;
receiving an APK file for an unknown application wherein it is unknown whether the application is a benign application or a malicious application;
converting the APK file of the unknown application into a bytecode file and a hex dump file;
extracting a plurality of features from each of the bytecode file and the hex dump file for the unknown application;
generating n-gram probabilities that the unknown application is one of a benign and malicious based on a plurality of machine learning n-gram base models trained on the hex dump features and generating a bytecode probability that the unknown application is one of a benign and malicious based on the machine learning bytecode base model trained on the bytecode file features;
assigning a weight to each of the n-gram probabilities for the unknown application and the bytecode probability for the unknown application to generate a plurality of weighted probabilities;
blending the generated weighted probabilities that the unknown application is one of a benign and malicious; and
predicting a label for the unknown application using the blended probability of the plurality of machine learning base models, wherein the label is one of benign and malicious.

2. The method of claim 1, wherein generating the plurality of machine learning base models further comprises extracting the feature set from each of the APK files for each machine learning base model.

3. The method of claim 1, wherein the bytecode file is a Delvik bytecode file.

4. The method of claim 1, wherein the plurality of features from the hex dump are two or more sets of n-gram features.

5. The method of claim 1, wherein generating the plurality of machine learning base models further comprises weighting the plurality of machine learning base models.

6. The method of claim 5, wherein weighting the plurality of machine learning base models further comprises using a logarithm loss algorithm to weight the machine learning base models.

7. An apparatus for malware assessment, comprising:
a processor and a memory;
the processor executing a plurality of lines of computer code so that the processor is configured to:
generate a plurality of base models from a plurality of Android application package (APK) files for applications that are known to be one of benign and malicious, each base model specifying, for a particular application, a probability of a benign application based on a set of features extracted from the APK file for the particular application and a probability of a malicious application based on a set of features extracted from the APK file for the particular application, wherein generating the plurality of base models further comprises receiving a feature set generated from a bytecode file and a feature set generated from a hex dump file for the applications that are known to be one of benign and malicious, training a machine learning base model on the feature set generated from the bytecode file and training a machine learning base model on the feature set generated from the hex dump to generate the plurality of machine learning base models;

receive an APK file for an unknown application wherein it is unknown whether the application is a benign application or a malicious application;
convert the APK file of the unknown application into a bytecode file and a hex dump file;
extract a plurality of features from each of the bytecode file and the hex dump file for the unknown application;
generate n-gram probabilities that the unknown application is one of a benign and malicious based on a plurality of machine learning n-gram base models trained on the hex dump features and generating a bytecode probability that the unknown application is one of a benign and malicious based on the machine learning bytecode base model trained on the bytecode file features;
assign a weight to each of the n-gram probabilities for the unknown application and the bytecode probability for the unknown application to generate a plurality of weighted probabilities;
blend the generated weighted probabilities that the unknown application is one of a benign and malicious; and
predict a label for the unknown application using the blended probability of the plurality of machine learning base models, wherein the label is one of benign and malicious.

8. The apparatus of claim 7, wherein the processor is further configured to extract the feature set from each of the APK files for each machine learning base model.

9. The apparatus of claim 7, wherein the bytecode file is a Delvik bytecode file.

10. The apparatus of claim 7, wherein the plurality of features from the hex dump are two or more sets of n-gram features.

11. The apparatus of claim 7, wherein the processor is further configured to weight the plurality of machine learning base models.

12. The apparatus of claim 11, wherein the processor is further configured to use a logarithm loss algorithm to weight the machine learning base models.

* * * * *